United States Patent
Dooley et al.

[11] Patent Number: 5,281,091
[45] Date of Patent: Jan. 25, 1994

[54] ELECTRICAL ANTI-ICER FOR A TURBOMACHINE

[75] Inventors: Kevin A. Dooley, Georgetown; Elwood A. Morris, Brampton, both of Canada

[73] Assignee: Pratt & Whitney Canada Inc., Longueuil, Canada

[21] Appl. No.: 632,854

[22] Filed: Dec. 24, 1990

[51] Int. Cl.⁵ .............................. F01D 25/02
[52] U.S. Cl. .................... 415/178; 415/114; 416/95; 244/134 D
[58] Field of Search ............... 415/177, 178, 114, 115, 415/116; 416/95, 96; 219/200, 201; 244/134 D

[56] References Cited

U.S. PATENT DOCUMENTS

| | | | |
|---|---|---|---|
| 1,807,359 | 5/1931 | Waters | 416/95 |
| 2,494,625 | 1/1950 | Martin | 416/95 |
| 2,507,018 | 5/1950 | Jewett et al. | 415/177 |
| 2,540,472 | 2/1951 | Boyd et al. | 416/95 |
| 2,695,146 | 11/1954 | De Witt | 416/95 |
| 2,709,892 | 6/1955 | Martin | 415/178 |
| 2,754,398 | 7/1956 | Rainbow | 244/134 D |
| 2,997,275 | 8/1961 | Bean et al. | 415/209.1 |
| 3,183,975 | 5/1965 | Keen | 416/39 |

FOREIGN PATENT DOCUMENTS 216941 1/1942 Switzerland .................. 416/95

*Primary Examiner*—Edward K. Look
*Assistant Examiner*—Michael S. Lee
*Attorney, Agent, or Firm*—Marshall E. Rosenberg; Troxell K. Snyder

[57] ABSTRACT

An electrical an (10) for the icing-susceptible stator vane stage (16) located in an air inlet section (12) of a turbomachine (not shown). A plurality of stator vanes (20) which are electrically isolated from a plurality of structural shrouds (30, 32) are grouped in one continuous, or a plurality of contiguous arcs about a fanshaft which is generally coincidental with the turbomachine's longitudinal axis (X—X). Low voltage alternating current is provided by an alternator (not shown). This current is directed through a plurality of electrical conductors (26) and is further distributed through each stator vane (20) which is either electrically conductive or employs an electrically conductive medium disposed proximate to an icing susceptible surface of an airfoil contour (21). The electrical current flow, which is generally directed in a radial orientation through each stator vane (20) causes a direct electrically-resistive heating effect to the airfoil contour surfaces (21) of the stator vanes (20).

3 Claims, 2 Drawing Sheets

ELECTRICAL ANTI-ICER FOR A TURBOMACHINE

FIELD OF THE INVENTION

This invention relates generally to gas turbine engines, and more particularly, to an anti-icing system for a stator vane stage contained therein.

BACKGROUND OF THE INVENTION

Turbomachines, such as those used in numerous aircraft applications, require a continuous flow of air through the machine to meet combustion process and cooling requirements.

Some turbomachines have an air inlet section in the form of a stator vane stage located in a forward area of the turbomachine. The vanes of this stage are positioned around the inlet area of the turbomachine like the spokes of a wheel. Each vane, which may have an airfoil cross-section, directs incoming air to a forward compressor section of the turbomachine.

The ambient air introduced to the turbomachine through its air inlet section may be characterized in terms of temperature, moisture content, and density. Icing of an air inlet structure may occur when the ambient temperature of in-flowing air is near freezing, or even a few degrees above freezing, in combination with a sufficient moisture content. A stator vane stage located in the air inlet section is one such icing-susceptible structure.

Icing may occur through a full range of aircraft and engine operating regimes, including operation in known icing conditions, as well as during periods of low power machine operation which may include an idle setting. For example, ice formation may occur during a descent maneuver when the engine is operating at idle, given the necessary conditions, absent an effective anti-icing system. In some turbomachines, throttling back to idle speed results in a reduction of temperature raise created by the rotors, with a correlating reduction in the pressure ratio of the air inlet section. Consequently, the surface temperature of stator blading suffers a correlated drop in temperature. The moisture contained in the impinging ambient air flow will freeze on the stator blades if the stator surface is not kept sufficient warm. While it is well know for icing to occur during engine idle operation, it is also know to occur at other power settings depending on ambient temperatures, flight speed, and moisture content of the inlet air. It is also well know for icing to occur in other flight regimes, such as takeoff or cruise, or even during apparently clear air low-humidity atmospheric conditions.

One anti-icing technique is to duct high temperature high pressure bleed air from a downstream machine section to the air inlet section. One problem with this technique is the consequential reduction of motive thrust by the turbomachine. Another problem with this technique is a correlated increase in the specific fuel consumption of the turbomachine during system operation due to the sacrificial airbleeding to the air inlet region. Yet another problem is the losses to the turbomachine due to the aerodynamically-comprising oversizing of the prior art stator vanes, whereby the oversizing was necessary to conduct and contain a sufficient volume of anti-icing bleed air.

A further problem with the prior practice is the need for a separate icing-condition sensor and related circuitry necessary to either alert the aircraft's crew to activate an anti-icing system or to automatically cycle the system as required.

SUMMARY OF THE INVENTION

It is an object of the present invention to provide a system for preventing or eliminating ice buildup at an air inlet region of a turbomachine.

It is another object of the present invention to provide a low-power-requirement anti-icing system which is also automatically operative at and above the turbomachine's idle speed.

These and other objects will become apparent in the further course of this disclosure.

The present invention provides a system for electrically heating an icing-susceptible stator vane stage located in an air inlet section of a turbomachine. The stator vanes, which are electrically isolated from their support structures, are grouped in one continuous or a plurality of contiguous arcs about the fan shaft, the vanes of each group being electrically connected in series.

Low voltage alternating current is directed through electrical conductors to each group of vanes and further distributed to each vane which is either electrically conductive or employs an electrically conductive medium disposed proximate to its icing-susceptible surfaces. The electrical current flow, which is generally directed in a radial orientation through each stator vane, causes a direct electrically-resistive heating effect to the vane surfaces.

This invention provides significant advantages over the prior art. A low power direct heating effect to the vane surfaces of the stator vane stage eliminates the need for sacrificial air bleed from a downstream section of the turbomachine, thereby minimizing losses of engine thrust and specific fuel consumption, as well as losses due to aerodynamically-compromised oversized stator vanes, while being fully operational at and above the machine's idle speed.

DETAILED DISCLOSURE

Figure 1:
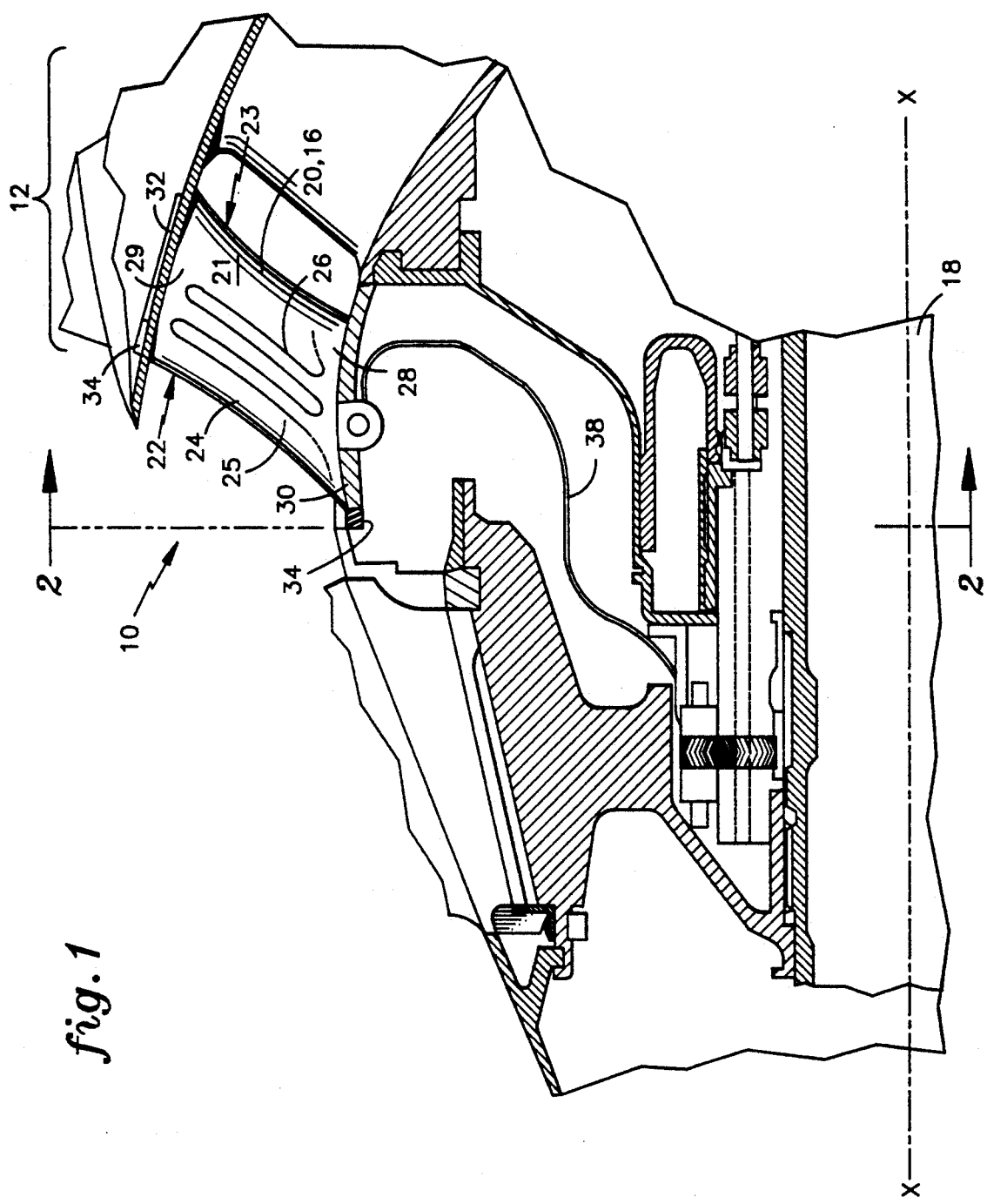
FIG. 1 is a cross-sectional view of an air inlet section of a turbomachine.

Referring to FIG. 1, the invention shown is a system 10 for controlling ice formation in an air inlet section 12 of a turbomachine (not shown). A plurality of stator vanes 20 comprise a stator vane stage 16 located in the air inlet section 12. Each stator vane 20 is radially disposed between and affixed to an inner shroud 30 and a parallel radially-outwardly spaced outer shroud 32, which is more clearly shown in FIG. 2. The stator vane stage 16 is concentrically disposed about a longitudinally disposed driveshaft/fanshaft 18 which is generally coincidental with the turbomachine's longitudinal axis X—X.

Each stator vane 20 has an airfoil contour 21 for directing inflowing ambient air to a forwardly disposed turbomachine compressor section (also not shown). The airfoil contour surface 21 of the stator vane 20 has a leading edge 22, a trailing edge 23, a suction side 24 and a pressure side 25. The stator vane 20 also has a radially inner end 28 and a radially outer end 29, each end connectable with the inner shroud 30 and the outer shroud 32, respectively. An electrically isolating vane support 34 may be used to structurally connect the inner stator vane end 28 with the inner shroud 30 and in a like manner to structurally connect the outer stator vane end 29 with the outer shroud 32, the structure of the vane support 34 being outside the scope and claims of the present invention. The vane supports 34 may be composed of a non-conductive material such as RTV or other elastomeric material.

Figure 2:
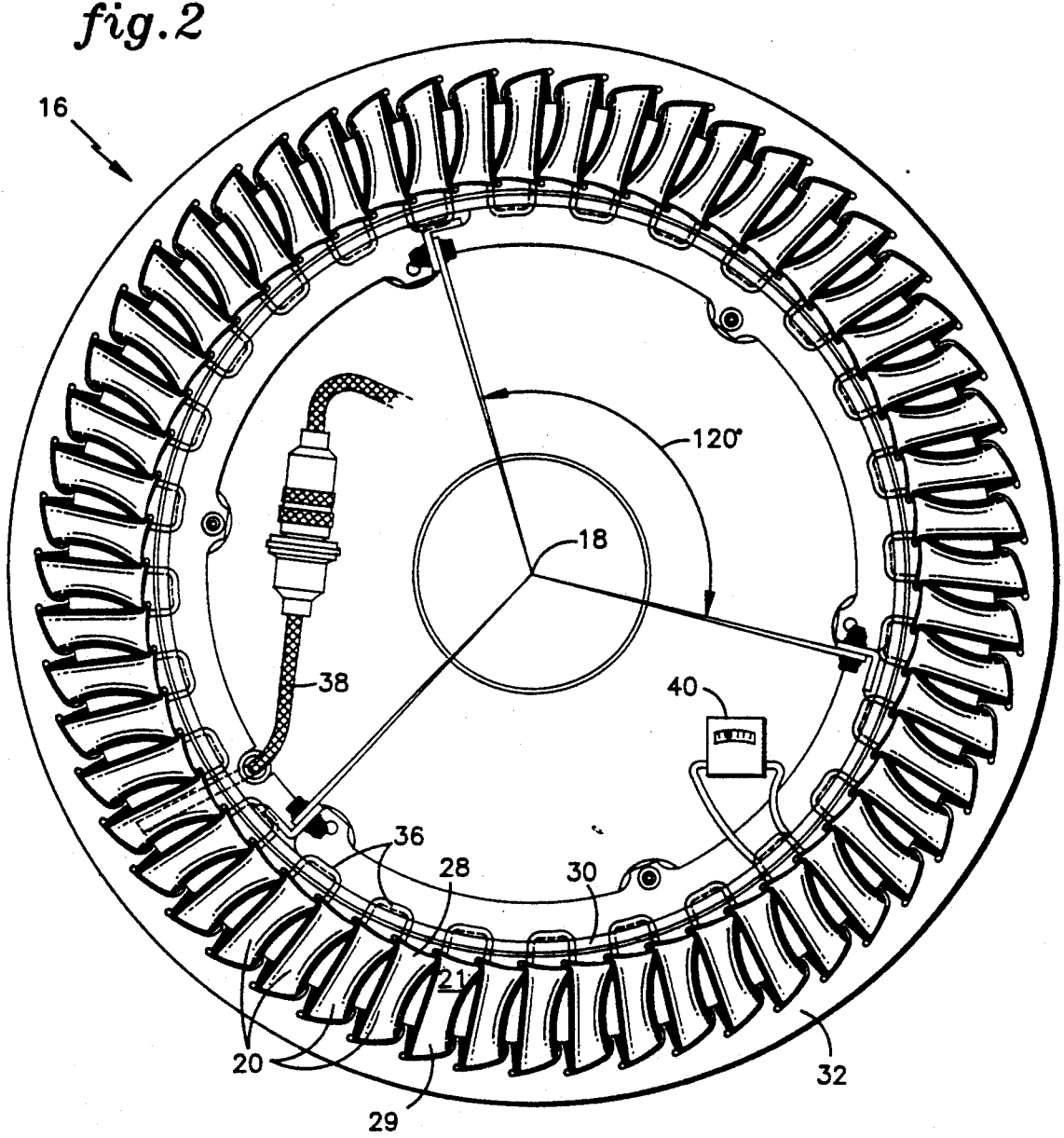
FIG. 2 is a partial frontal view of the air inlet section.

Now referring to FIG. 2, electrically conducting end links 36 may be used to electrically join pairs of inner stator vane ends 28 or outer stator vane ends 29 of the stator vanes 20. One embodiment of the present invention shows sequential electrical connection of alternating pairs of stator vane ends 28, 29 of adjacent stator vanes 20, thus forming a series-connected three-phase delta electrical configuration. Furthermore, the end-links 36 provide an inherent resistive heating effect to the system. As will be appreciated by those skilled in the art, alternative electrical configurations, such as parallel electrical conduction among the stator vanes 20, will be deemed to be within the scope of this invention.

A plurality of electrical conductors 38 direct electrical current from a power generator (not shown) to the electrically combined array of stator vanes 20. Electrical power is provided to the system by an alternator or other generator which may be driven by either the fanshaft of the immediate turbomachine, an accessory driveshaft of the immediate turbomachine, a driveshaft of another turbomachine disposed in the same aircraft, or by other power generating means. In one embodiment, an electrical power generating alternator is disposed within the fan hub of the fanshaft of the immediate turbomachine.

The stator vanes 20 of the stator vanes stage 16 may be individually wired to the power generator (not shown) or wired in groups wherein each group of stator vanes 20 may be arrayed in a predetermined arc disposed about the air inlet section 12. In one embodiment of the present invention, the circumferentially disposed array of stator vanes 20 is divided into three electrically discrete sectors or sub-arrays, each sub-array spanning about a 120 degree arc of a plane perpendicular to the turbomachine's longitudinal axis X—X thus forming a three phase delta electrical configurations. The vanes of each sub-array are electrically connected in series and then joined to the power generator (not shown) with a plurality of electrical conductors 38. The power generator produces a current output of approximately one volt and a 1000 ampere current flow through each arc of the arrayed stator vanes 20. A threshold current output established at engine idle speed, which may be a designed-in operating parameter of the electrical generator, provides the appropriate power output necessary for sufficient heating of the airfoil contour surfaces 21 of the stator vanes 20 at and above idle speeds. When sized appropriately, the anti-icing system 10 provides a sufficient heating effect to the airfoil contour surfaces 21 at and above the turbomachine's idle speed, therefore, requiring no action on the part of the aircraft crew or of automated systems. A pilot selectable over-ride switch (not shown) controlling the system 10 may be included in the circuitry of the system. Furthermore, a current flow indicator 40 may be incorporated into the system's circuitry to indicate the system's operating status. Since the frequency of the alternating current is a function of rotor speed, the alternator may also serve as a tachometer generator.

Figure 3:
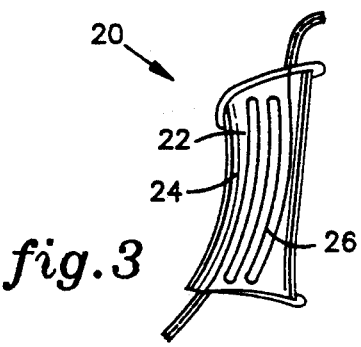
FIG. 3 is an isometric view of a stator vane disposed in the air inlet section.

Electrical power provided by the generator (not shown) is directed through electrical conductors 38 to the electrically communicative stator vanes 20. The stator vanes 20 may be electrically conductive being fabricated of steel, aluminum, titanium, or another electrically conductive alloy. Alternatively, the stator vanes 20 may conduct electrical current from the power generator through a plurality of electrical conductors 26 disposed proximate to an icing-susceptible airfoil surface 21 as exemplified in FIG. 3. These electrical conductors 26 may be arrayed in a matrix or grid format which provides a heating effect to a leading edge 22 or a suction side 24 of the airfoil contour surface 21. It is also contemplated that other selected portions of the airfoil contour surface 21 of a particular stator vane 20 may be heated by the system 10 of the present invention.

Further modifications and improvements of the invention herein disclosed will occur to those skilled in the respective arts and all such modifications and improvements are deemed to be within the scope of the invention as defined by the appended claims.

We claim:

1. A system for controlling ice formation in an air inlet section of a turbomachine, comprising:
   a plurality of electrically conductive stator vanes circumferentially disposed about the air inlet section, each vane extending radially between an inner shroud and an outer shroud, each vane connected at the radially inner and outer end thereof to the corresponding shroud by a nonconductive vane support;
   a plurality of electrically conducting end links, each link extending circumferentially between two adjacent vanes for electrically joining the corresponding ends thereof; and
   means for conducting electric current to said two linked, adjacent stator vanes.

2. The system as recited in claim 1, wherein
   the end links disposed between adjacent stator vane pairs alternate circumferentially between joining the adjacent radially inner ends and outer ends of said vanes, thereby forming a series-connected electrical configuration.

3. The system as recited in claim 2, wherein
   the series connected electrical configuration of stator vanes and end links extends about a 120° arc of the circumference of the air inlet, and wherein
   the means for conducting electric current to the linked adjacent stator vanes is connected to one end of each vane disposed at the limits of said arc.

* * * * *

UNITED STATES PATENT AND TRADEMARK OFFICE
CERTIFICATE OF CORRECTION

PATENT NO. : 5,281,091

DATED : January 25, 1994

INVENTOR(S) : Kevin A. Dooley et al

It is certified that error appears in the above-identified patent and that said Letters Patent is hereby corrected as shown below:

Title Page, Abstract, Line 1   After "an" insert --anti-icing system--

Signed and Sealed this

Eighteenth Day of April, 1995

Attest:

Attesting Officer

BRUCE LEHMAN

*Commissioner of Patents and Trademarks*